United States Patent [19]
Haun et al.

[11] Patent Number: 5,337,205
[45] Date of Patent: Aug. 9, 1994

[54] DUAL VOLTAGE POWER SUPPLY

[75] Inventors: Andy A. Haun; Jerry R. Baack, both of Cedar Rapids, Iowa

[73] Assignee: Square D Company, Palatine, Ill.

[21] Appl. No.: 937,919

[22] Filed: Aug. 31, 1992

Related U.S. Application Data

[63] Continuation-in-part of Ser. No. 558,130, Jul. 24, 1990, Pat. No. 5,189,587.

[51] Int. Cl.⁵ .................................................. H02H 9/04
[52] U.S. Cl. ........................................ 361/56; 361/90; 361/18
[58] Field of Search ................... 361/18, 56, 91, 89, 361/102, 90, 92

[56] References Cited

U.S. PATENT DOCUMENTS

| | | | |
|---|---|---|---|
| 3,539,865 | 11/1970 | Billings | 361/18 |
| 4,525,765 | 6/1985 | Brajder | 361/18 |
| 4,918,562 | 4/1990 | Pulizzi et al. | 361/86 |
| 4,999,728 | 3/1991 | Curl | 361/56 |
| 4,999,730 | 3/1991 | Pickard | 361/86 |
| 5,144,517 | 9/1992 | Weith | 361/55 |

Primary Examiner—Todd DeBoer
Attorney, Agent, or Firm—Larry I. Golden; Kareem M. Irfan

[57] ABSTRACT

For use in a trip unit, a switched current shunting arrangement in a circuit interruption tripping system couples the current transformers to a relatively low voltage and it accumulates a high level of energy quickly at power-up so that the tripping solenoid can promptly be energized after the detection of a spurious fault condition. The arrangement regulates supply current from the current transformers to a trip voltage capacitor and to a supply capacitor at the input of a voltage regulation circuit. The current transformer charges the trip voltage capacitor to a first prescribed voltage level, and a current shunting circuit shunts current passing from the current transformer to the supply capacitor, such that during normal operation the supply capacitor is charged to a second prescribed voltage level, which is less than the first prescribed voltage level. In response to the trip voltage capacitor charging to the first prescribed voltage level, the supply current is allowed to flow from the current transformer to the supply capacitor and the trip voltage capacitor is isolated from the supply capacitor once the trip voltage capacitor is charged to the first prescribed voltage level. This isolates the current transformer from seeing the high voltage on the trip voltage capacitor while permitting a high level voltage to be quickly obtained on the trip voltage capacitor.

20 Claims, 4 Drawing Sheets

DUAL VOLTAGE POWER SUPPLY

CROSS-REFERENCE TO RELATED APPLICATION

This is a continuation-in-part of U.S. patent application No. 07/558,130, filed on Jul. 24, 1990 and entitled "Dual Shunt Current Regulator," now U.S. Pat. No. 5,189,587.

FIELD OF THE INVENTION

This invention relates generally to current regulators and, more particularly, to a solid state current shunting circuit arrangement for controlling the amount of current applied to a load.

BACKGROUND OF THE INVENTION

Solid state current regulators are commonly used in conjunction with power supplies to protect electrical circuits and devices coupled thereto. Such regulators are commonly use in circuit interruption tripping systems for 3-phase power lines. In this application, a solid state current regulator controls the amount of current provided from the 3-phase power line to the system power supply. As the magnitude of the power in the line increases beyond a prescribed limit, the current regulator responds by shunting excess current from the line to system ground.

Known current regulators may be categorized as being either a linear shunt type regulator or a switched shunt type regulator. A typical linear shunt type regulator includes a resistor and zener diode arranged in series between the current line and ground with their interconnection controlling the base of a P-N-P Darlington transistor. When the current magnitude in the line exceeds the breakdown voltage of the zener diode, the Darlington transistor is enabled, and the excess current from the current line is shunted through the Darlington transistor to ground. This type of regulator is useful and desirable when the current level in the line is low. However, it consumes a significant amount of power, due to the regulated voltage across the transistor, when the current level in the line is high. In applications where significant levels of heat cannot be dissipated or where space or cost does not accommodate heat sinking devices, this type of shunting arrangement is unacceptable.

Switched current shunting arrangements typically involve a more complex arrangement of circuitry to enable the current path to be shunted from the line to ground. For example, in U.S. Pat. No. 4,809,125, by Matsko et al., a power supply circuit employs a custom design IC (integrated circuit) for monitoring the current level of the line and controlling the bias on a transistor which is selectively enabled to shunt excess current from the line to ground. Another known type of switched current shunting arrangement employs a comparator and a voltage divider circuit at an input of the comparator for determining when to enable a transistor which shunts the excess current from the line to ground.

While switched current shunting arrangements may be controlled so that they do not exhibit the heat dissipation problem (familiar to linear shunt type regulators), they are also not without fault. One of most significant problems associated with a switched current shunting arrangement is its tendency to generate unacceptable levels of noise. This can and does significantly impair circuit operation in certain applications. For instance, in a circuit interruption tripping system using current transformers to sense and induce the current from the line, a switched current shunting arrangement can affect the electromagnetics of the current transformers and cause them to misrepresent the true current levels in the line. Under certain conditions, the electromagnetic flux in the sensor will collapse, inducing a sensor current to the extent that the tripping system will determine that a fault has occurred and command an interruption.

Ideally, a switched current shunting arrangement in a circuit interruption tripping system couples the current transformers to a relatively low voltage and it accumulates a high level of energy quickly at power-up so that the tripping solenoid can promptly be energized after the detection of a spurious fault condition. Coupling the current transformers into a relatively high voltage will adversely affect the electromagnetics of the current transformers, as described above, and failing to quickly accumulate high levels of energy at start-up prevents the trip unit from promptly removing the fault from the system. Known trip-unit power supply arrangements have compromised on these ideals by accumulating, over an excessively long time period, large amounts of energy at lower levels, and inhibiting the trip unit from promptly removing the fault from the system.

Accordingly, there is a need for a power supply which overcomes the above problems associated with the prior art.

SUMMARY OF THE INVENTION

The present invention provides a power supply in the form of a current regulator having essentially noise-free operation and no generation of excessive heat.

The present invention also provides a current regulator which uses a first shunting path to accommodate current regulation for normal level currents and a second shunting path to accommodate current regulation for higher level currents.

According to another embodiment, the present invention provides a switched current shunting arrangement, for use in a circuit interruption tripping system, which couples the current transformers to a relatively low supply voltage and accumulates a high level of energy quickly at power-up at a trip voltage capacitor, so that the tripping solenoid can promptly be energized after the detection of a spurious fault condition. This prevents the current transformers from being coupled to a relatively high voltage during normal operation and, therefore, maintains high performance of the electromagnetics of the current transformers.

In yet another and more particular embodiment of the present invention, a switched current shunting arrangement in a circuit interruption tripping system couples the current transformers to a relatively low voltage and it accumulates a high level of energy quickly at power-up so that the tripping solenoid can promptly be energized after the detection of a spurious fault condition. The arrangement regulates supply current from the current transformers to a trip voltage capacitor and to a supply capacitor at the input of a voltage regulation circuit. The current transformer charges the trip voltage capacitor to a first prescribed voltage level, and a current shunting circuit shunts current passing from the current transformer to the supply capacitor, such that during normal operation the supply capacitor is charged to a second prescribed voltage level, which is less than the first prescribed voltage level. In response to the trip voltage capacitor charging to the first prescribed voltage level, the supply current is allowed to flow from the current transformer to the supply capacitor and the trip voltage capacitor is isolated from the supply capacitor once the trip capacitor is charged to the first prescribed voltage level. This isolates the current transformer from seeing the high voltage on the trip voltage capacitor while permitting a high level voltage to be quickly obtained on the trip voltage capacitor.

BRIEF DESCRIPTION OF THE DRAWINGS

Other objects and advantages of the invention will become apparent upon reading the following detailed description and upon reference to the drawings in which.

Figure 1:
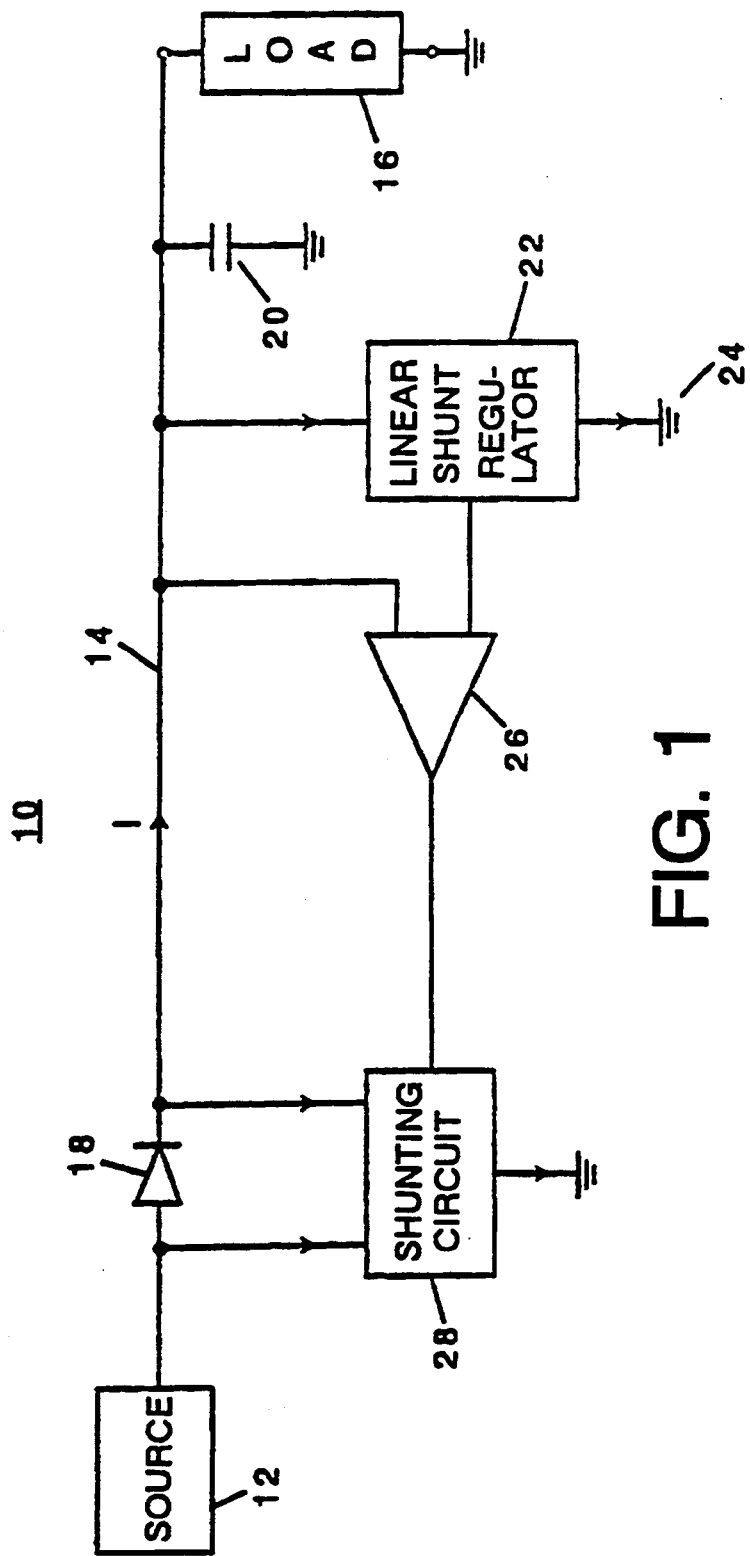
FIG. 1 is a block diagram of a circuit arrangement, in accordance with the present invention, for controlling the amount of supply current from a current source to a load.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention has direct application for sensing and shunting excess current in a current path in an electrical distribution system. While any type of current source may benefit from the present invention, it is particularly useful for monitoring and shunting current in circuits drawing power from three-phase power lines.

Turning now to the drawings, FIG. 1 is a block diagram depicting an embodiment of the present invention for general application. A circuit arrangement 10 is shown controlling the amount of current supplied from a current source 12 along a line 14 to a load 16. The current on the line 14 passes through a blocking diode 18 and charges a capacitor 20. When the source current exceeds a first threshold level and charges the capacitor 20 to a prescribed voltage, a linear shunt regulator circuit 22 allows current to flow to a circuit neutral terminal 24, thereby shunting the excess current to ground.

At the output of the linear shunt regulator circuit 22, a sensor voltage signal is provided in proportion to the current passing through the linear shunt regulator circuit 22. A switching circuit 26 receives both the sensor voltage signal and a reference voltage signal (not shown in FIG. 1), the latter of which is also preferably proportional to the supply current, to determine if the current level in the line has exceeded a second threshold level. If the current level in the line has exceeded that second level, an additional shunting path, via a second shunting circuit 28, is selectively enabled to provide the necessary current regulation when the current in the line 14 is at high levels.

Figure 2:
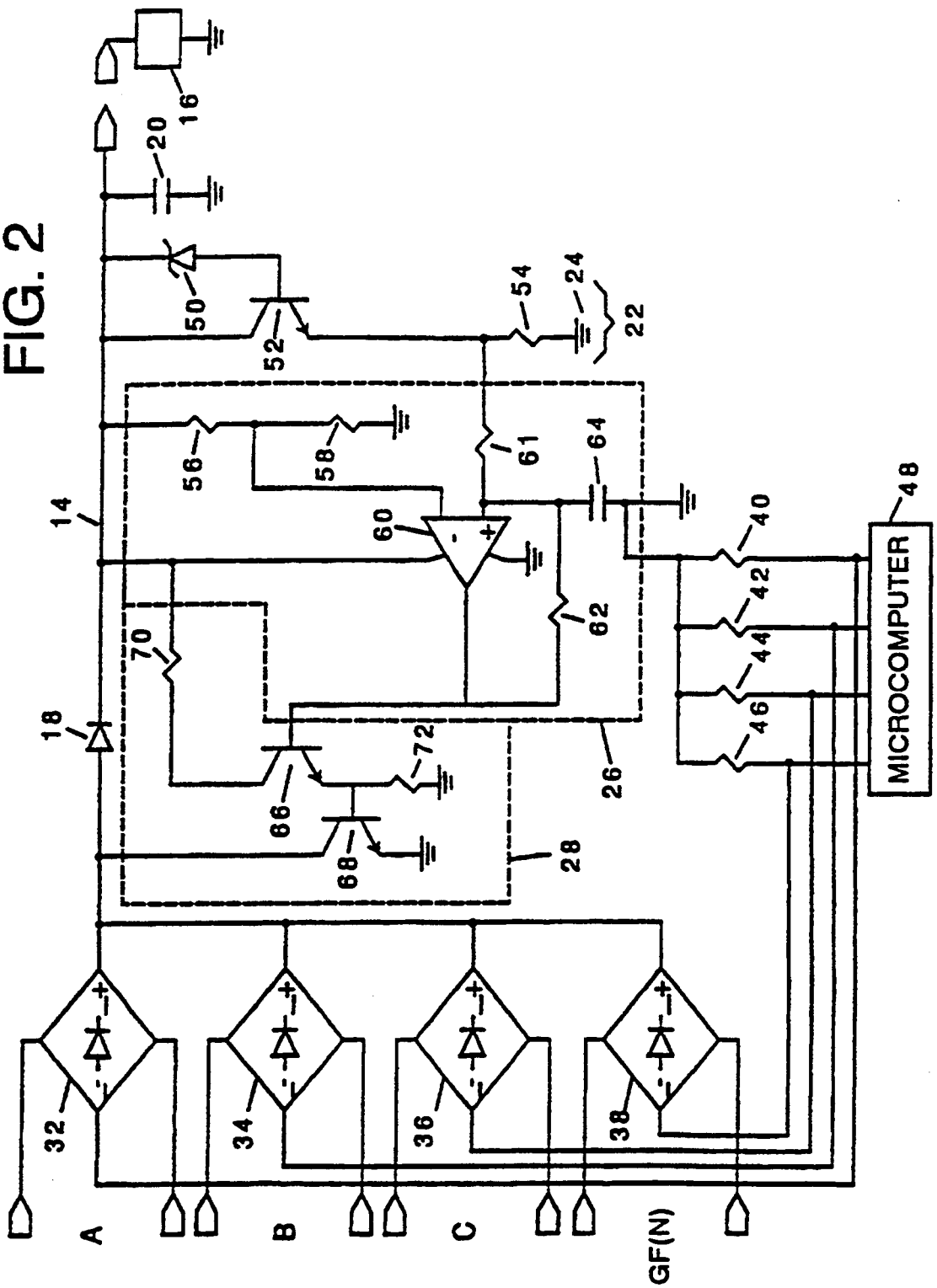
FIG. 2 is a schematic diagram of an embodiment of the circuit arrangement of FIG. 1 for a particular application.

FIG. 2 is a schematic diagram of an embodiment of the circuit arrangement of FIG. 1 for the specific application of monitoring and shunting current in circuits drawing power from three phase power lines. In FIG. 2, the current supplied on the line 14 is a current summation of current sensed from a three-phase power line arrangement (not shown). Current transformers (not shown) provide induced current from the three phases (A, B, C and N), and the ground fault summation (GF=$\Sigma$(A+B+C+N)) to one of four full-wave rectifiers 32, 34, 36 and 38, whose outputs are interconnected at the anode of the diode 18 to provide the current on line 14.

The rectifiers may be used to provide a desirable interface between the three-phase lines and the remaining aspects of the circuit arrangement so that the three-phase lines may be accurately monitored. On the left side of each of the rectifiers, negative phase current signals are carried through a series of burden resistors 40, 42, 44 and 46. The values of these burden resistors are selected for the multiple phases and current transformers so that known voltages may be developed which correspond to the magnitudes of the current in the line 14. The developed voltages are then used for subsequent processing and fault analysis by a microcomputer 48, for example, in a tripping system or current monitoring system. For further information regarding an applicable tripping system, reference may be made to U.S. Pat. No. 5,136,457, filed on Aug. 31, 1989 and entitled "Processor Controlled Circuit Breaker Trip System Having An Intelligent Rating Plug," and to U.S. Pat. No. 4,331,999, entitled "Circuit Interrupter With Digital Trip Unit And Power Supply," each of which is incorporated herein by reference.

On the right side of each of the rectifiers, positive phase currents are summed and act as the source for the current supplied on line 14.

The current supplied on line 14 is monitored and responded to at two different thresholds, as discussed in connection with FIG. 1. The first threshold is established by a zener diode 50, a transistor 52 and a resistor 54 within the linear shunt regulator circuit 22. When the voltage on the capacitor 20 charges beyond the breakdown region of the zener diode 50, the base-emitter junction of the transistor 52 becomes forward biased, and a current path develops from the line 14 through the base-emitter junction of transistor 52 and through resistor 54 to ground or a designated common neutral terminal.

The second threshold level is defined in the switching circuit 26 by a pair of resistors 56 and 58 at the input of a comparator 60. The comparator 60 monitors the voltage at the emitter of the transistor 52 through a resistor 61. This emitter voltage increases in proportion to the excess current on the line 14. When the emitter voltage reaches the reference voltage established by the resistors 56 and 58, the comparator 60 enables the second shunting circuit 28 to provide additional shunting of the excess current from the line 14.

Like the voltage at the emitter of the transistor 52, the reference voltage established through the resistors 56 and 58 is also proportional to the supply current in the line 14. The rate of increase by the reference voltage with respect to the line voltage held by capacitor 20 is defined by the ratio of the resistors 56 and 58. Using a 10:1 ratio between the resistors 56 and 58, for example, for every ten volts of increased charge on the capacitor 20, the reference voltage increases one volt. In contrast, the voltage at the emitter of the transistor 52 follows the line voltage held by capacitor 20 volt-for-volt in excess of the zener breakdown voltage. Thus, while both voltage levels increase with the supply current as they are monitored by the comparator 60, using the above example, the voltage at the emitter of the transistor 52 will increase (or decrease) ten times faster than the reference voltage defined by the resistors 56 and 58.

These line-dependent voltage levels are used by the comparator to provide hysteresis-like control to the second shunting circuit 28. Positive feedback around the comparator 60 is provided by a resistor 62 and a capacitor 64 to force the output of the comparator 60 to follow the emitter voltage of the transistor 52 and, therefore, the voltage on the line 14. As soon as the line voltage reaches the second threshold, the comparator 60 enables the second shunting circuit 28, which is defined in FIG. 2 by transistors 66 and 68 and resistors 70 and 72, to discharge the capacitor 20 for a brief interval through the respective current paths defined by the base-emitter junction of transistor 52 and the resistor 54, the base-emitter junctions of transistors 66 and 68 and the resistors 70 and 72, the load 26 and the resistors 56 and 58. Based on the discharge period of the capacitor 20 and the associated discharge paths, the switch frequency is faster than the *LR* characteristic of the current transformer and the load circuits. Thus, when switching occurs, the electromagnetics are not adversely affected.

As an example, consider the following values for the components illustrated in FIG. 2: resistors 54, 56, 58, 61, 62, 70 and 72 having the values 20, 100k, 10k, 4.7k, 100k, 1.8k and 1.8k Ohms, respectively; and capacitors 20 and 64 having values of 100 microfarads and 2200 picofarads, respectively. Additionally, assume that the zener diode 50 has a 12 volt breakdown, and that transistors 52, 66 and 68 are TIP41, 2N3904 and TIP142 types, respectively. The comparator 60 may be implemented using a conventional LM358 type operational amplifier circuit.

In this example, before any excess current is developed on the line 14, the output of the comparator 60 will be in its logic low state and the transistors 52, 66 and 68 will not be shunting current from the line 14. Consequently, the voltage at the emitter of transistor 52 will be approximately at the level of the neutral terminal 24. When the excess current charges the capacitor 20 to the extent that the breakdown voltage of the zener diode 50 is reached, the transistor 52 begins to shunt current from the line 14, thereby causing the level of the reference voltage of the resistors 56 and 58 to fall at one tenth of the rate of the voltage at the emitter of the transistor 52. The output of the comparator 60 will remain low until the line voltage forces the voltage at the emitter of the transistor 52 to exceed the reference voltage, at which time the output of the comparator 60 will transit to the high state.

Once the output of the comparator 60 is high, the transistor 68 will draw current from the line 14 to allow the voltage on the capacitor 20 to slowly discharge from the line 14 on the cathode side of the diode 18 through the transistor 66 and the resistors 70 and 72, the linear shunt regulator circuit 22, the load 16 and the switching circuit 26. The discharge rate is substantially defined by the RC time constant of these components. The blocking diode 18 prevents the transistor 68 from discharging the capacitor 20 so that the output of the comparator 60 will remain high for the prescribed discharge time. The RC time constant defined by resistor 62 and capacitor 64 also determines the frequency at which the output of the comparator 60 will transit from low to high, assuming a steady state current in the line 14.

It is also important to note that there is a negligible amount of heat generated through the linear shunt regulator circuit 22, and no noise generated from the second shunting circuit 28 at low current levels below switch level. The dissipated heat can be ignored because the transistor 52 is only required to shunt low levels of current from the line 14, and its associated shunting path is defined by the resistor 54 having, for example, a relatively small value, e.g., 20 Ohms.

The lack of noise is a consequence of the band width of the current transformers and the hysterisis being selectively controlled to provide a frequent transit rate at the output of the comparator 60. This frequency is relatively fast, so that the noise generated is limited and above the band width of the current transformers. Thus, the noise problem that is common to many of the prior art switched shunt current regulator circuits is alleviated.

Accordingly, by using the linear shunt regulator circuit 22 for low current level currently and by selectively enabling the second shunting circuit 28 for shunting higher level current, only for only brief intervals and at a relatively high frequency, the noise and heat problems of the prior art current regulators may be avoided.

Figure 3:
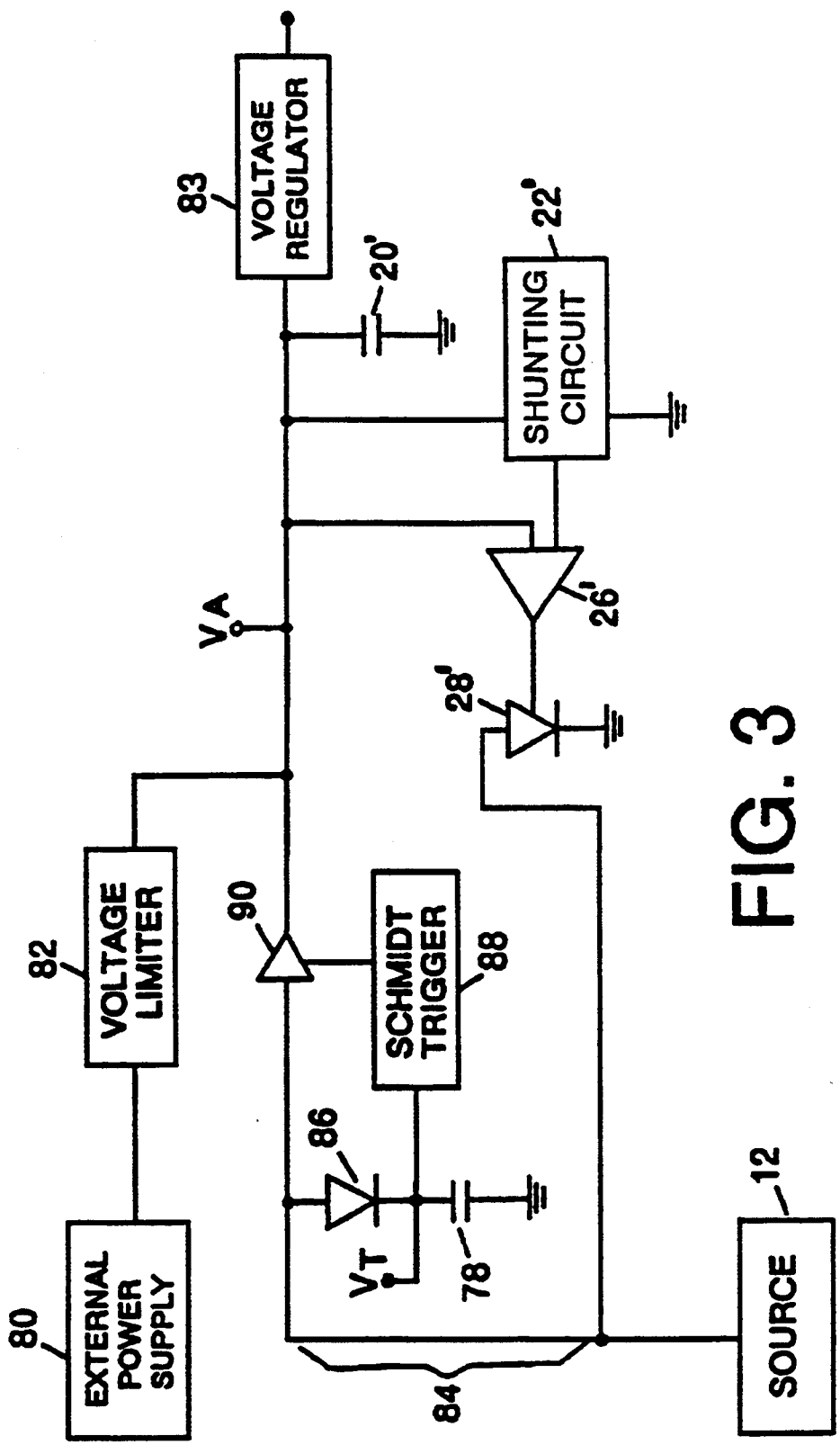
FIG. 3 is a block diagram of an alternative circuit arrangement, also in accordance with the present invention.

Referring now to FIG. 3, the basic block diagram of FIG. 1 has been modified to include an isolated high level solenoid trip voltage (denoted as "$V_T$") on a capacitor 78, an external power supply 80 and associated power supply voltage limiter 82. The power source 12 is the primary source of power and the external power supply 80 is an optional secondary source of power. Both feed a voltage regulator 83, and only the power source 12 feeds the capacitor 78. The power supply voltage limiter 82 is used to prevent the voltage provided by the external power supply 80 from causing the second shunting circuit 28' to activate.

The trip voltage $V_T$ is isolated from the voltage on capacitor 20' by a circuit 84 including diode 86, Schmidt trigger 88 and switch 90. Generally, the circuit 84 operates at power up by allowing the capacitor 78 to charge to a high voltage level (e.g., 20 Volts), at which time the path from the current source 12 is switched from the path leading to the capacitor 78 to the path leading to the capacitor 20'. This is accomplished via the switch 90 and by maintaining the voltage level on the capacitor 20' below the voltage level on the capacitor 78, so that the diode 86 blocks current passing from the capacitor 78 to the capacitor 20'. The first and second shunting circuits 22' and 28' are used to monitor and maintain the voltage level on the capacitor 20', so that it does not exceed the critical level.

In trip unit applications in which current transformers are used as the source 12, this implementation requires that the current transformers be coupled into the high voltage level on the capacitor 78 for only the brief moment required to charge capacitor 78 to the prescribed level. Once the path is switched by the switch 90, the current transformers are coupled into the relatively low voltage level on the capacitor 20'. Thus, as in the ideal situation, the system couples the current transformers to a relatively low voltage during normal operation, it accumulates a high level of energy quickly at power-up so that the tripping solenoid can promptly be energized after the detection of a spurious fault condition, and there is no adverse effect on the electromagnetics of the current transformers.

Figure 4:
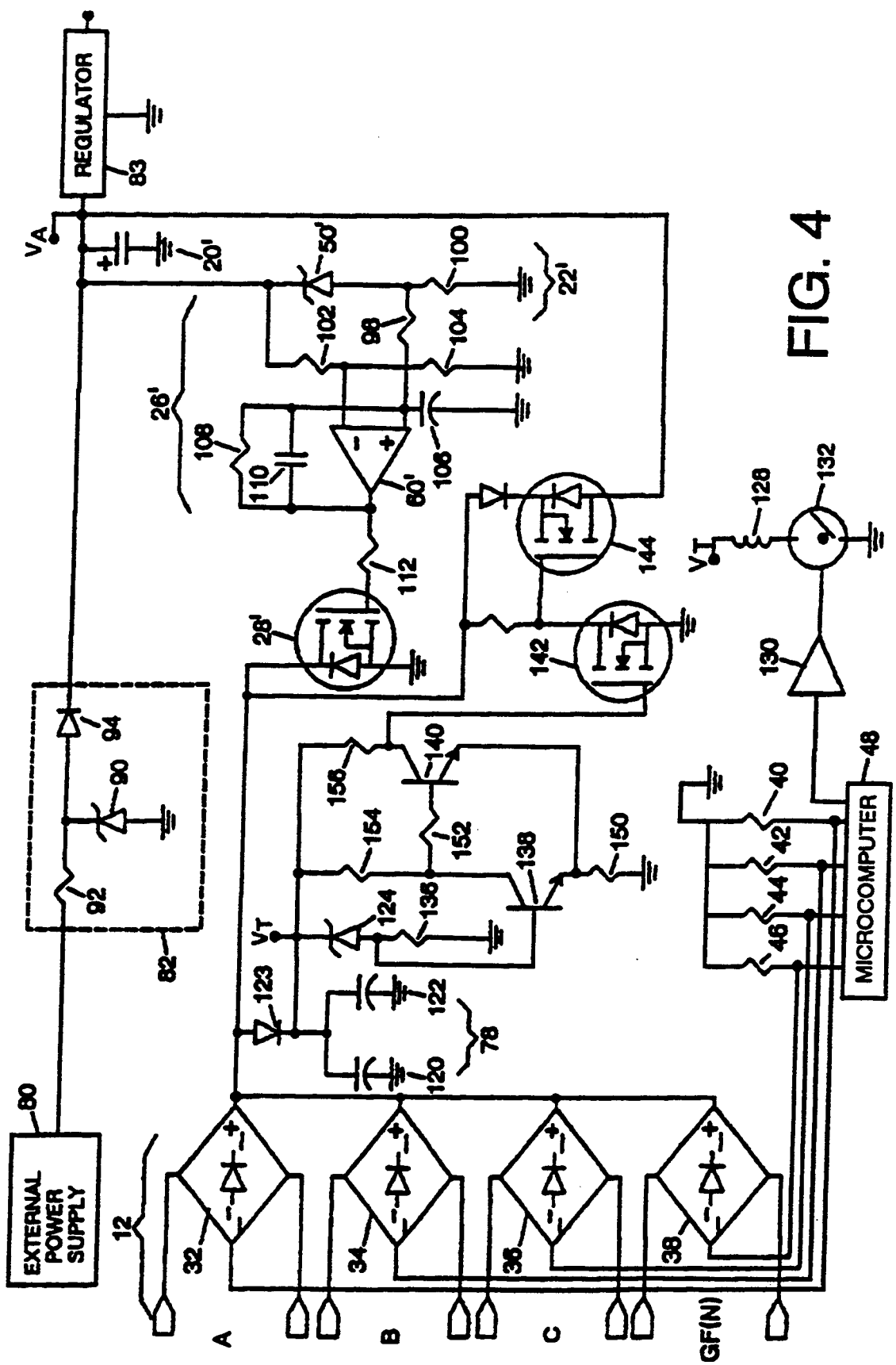
FIG. 4 is a schematic diagram of an embodiment of the circuit arrangement of FIG. 3 for a particular application.

In FIG. 4, the trip unit application referred to above is shown in detailed schematic form. Because this circuit implementation of FIG. 4 is a modification of the circuit of FIG. 2, common components are depicted using common reference numerals.

The power supply voltage limiter 82 is shown to include a zener diode 90 providing a 9.1 Volt limit so that the 10 Volt zener diode 50', and therefore the second shunting circuit 28', will not be effected by the external power supply 80. Also included as part of the power supply voltage limiter 82 are a 120 Ohm resistor 92 and a diode 94. The resistor 92 limits the current passing from the external power supply 80, and the diode 4 acts to block current which might otherwise pass from the current transformers 32, 34, 36 and 38 to the zener diode 90.

The first shunting circuit 22' and the second shunting circuit 28' of FIG. 4 operate in essentially the same manner as the corresponding shunting circuits 22 and 28 of FIG. 2, with the switching circuit 26' providing the same switching function for the second shunting circuit 28' as was previously described for the comparable circuits 26 and 28 of FIG. 2. In the embodiment of FIG. 4, the depicted components in this section of the circuit diagram are: 100 uF capacitor 20', 1 kOhm resistors 98 and 104 and 112, 10.0 Ohm resistor 100, 10 kOhm resistor 102, 0.0022 uF capacitor 106, 820kOhm resistor 108, and 0.001 uF capacitor 110.

The load which is supplied the energy stored on capacitor 20' of FIG. 4 is the voltage regulator 83, which is used to provide operating power (e.g., +5 Volts) to the microcomputer 48 and other digital circuits forming part of the trip system. The conventional support circuitry typically associated with the voltage regulator 83 is not considered part of the present invention and is, therefore, not shown.

Referring now to the current path from the current transformers 32, 34, 36 and 38 to the capacitor 78 (shown as two parallel 47 uF capacitors 120 and 122), the trip voltage $V_T$ is developed rapidly onto capacitor 78 upon power up via blocking diode 123. The breakdown threshold of a zener diode 124 is selected at a prescribed level so that the current path from the current transformers 32, 34, 36 and 38 to the capacitor 78 is shut down once the desired trip voltage is reached. For example, a breakdown threshold of the zener diode 124 at 19 Volts and a desired trip voltage of 20 Volts is acceptable for engaging the solenoid 128, which is activated by the microcomputer 48 via a passive low pass filter circuit 130 and a switch 132.

Once the threshold level of the zener diode 124 is reached, the zener diode 124 conducts current and, via a 10 kOhm voltage biasing resistor 136, activates a transistor 138. The transistor 138 and another transistor 140 are arranged to act as a Schmidt trigger, which in turn activates FETs 142 and 144. The Schmidt trigger arrangement also includes 470 Ohm resistor 150, 100 kOhm resistor 152, 33 kOhm resistor 154 and 10 kOhm resistor 154.

In response to the activation of FET 144, energy is supplied to the capacitor 20' via the current path from the current transformers 32, 34, 36 and 38, so that the voltage regulator 83 is activated. For example, using a breakdown threshold of the zener diode 124 at 19 Volts and the desired trip voltage of 20 Volts, the analog voltage ("$V_A$") on the capacitor 20' is nominally 12 Volts, which is sufficient to a drive voltage regulator having a 5 Volt output (for instance, an LM2950 type regulator).

The analog voltage $V_A$ is then regulated by the first and second shunting circuits 22' and 28' as previously described, with the second shunting circuit 28' shunting excessive current directly from the current source 12. If the trip voltage $V_T$ drops below the zener threshold level on zener diode 124, the current from the current transformers is redirected to the capacitor 78.

While the present invention has been described with reference to particular embodiments, those skilled in the art will recognize that many changes may be made thereto without departing from the spirit and scope of the present invention, which is set forth in the following claims.

We claim:

1. A circuit arrangement, for regulating supply current in a first current path from a source to a first load and in a second current path from the source to a second load, comprising:

a capacitor, coupled to the first current path, for storing energy from the source, such that the source charges the capacitor to a first prescribed voltage level;

maintenance means, coupled to the second current path, for maintaining a second prescribed voltage level, which is less than the first prescribed voltage level, at the second load;

enabling means, responsive to the capacitor charging to the first prescribed voltage level, for enabling the supply current to flow from the source to the second load via the second current path; and isolation means, coupled between the capacitor and the second load and also responsive to the capacitor charging to the first prescribed voltage level, for isolating the energy on the capacitor from the source.

2. A circuit arrangement, according to claim 1, wherein the capacitor quickly accumulates the energy from the source in response to a voltage level on the capacitor being substantially less than first prescribed voltage level.

3. A circuit arrangement, according to claim 1, wherein said maintenance means includes first detection means for detecting a current level in the supply current which exceeds a first predetermined threshold and a first shunting circuit, responsive to the first detection means, for shunting a portion of the supply current provided from the source.

4. A circuit arrangement, according to claim 3, wherein said maintenance means further includes second detection means, responsive to the first detection means, for detecting a current level in the supply current that exceeds a second predetermined threshold which is greater than the first threshold, and a second shunting circuit, responsive to the second detection means, for shunting a portion of the supply current provided from the source, wherein the second detection means selectively enables the second shunting circuit so that the second shunting circuit shunts higher levels of supply current than the first shunting circuit for prescribed intervals.

5. A circuit arrangement, according to claim 4, wherein the second detection means includes a switching circuit which responds to the second threshold means by selectively enabling the second shunting circuit at a rate that is a function of the level of the supply current.

6. A circuit arrangement, according to claim 4, wherein the second detection means further includes means for generating a reference voltage which is proportional to the supply current.

7. A circuit arrangement, according to claim 1, wherein the first load includes a trip coil.

8. For use in a trip unit, a circuit arrangement for regulating supply current in a first current path from a current transformer to a trip voltage capacitor and in a second current path from the current transformer to a voltage regulation circuit, comprising:
means for coupling the trip voltage capacitor to the first current path such that the current transformer charges the trip voltage capacitor to a first prescribed voltage level;
a supply capacitor coupled to the second current path and an input of the voltage regulation circuit;
current shunting means, coupled to the second current path, for shunting current passing from the current transformer to the supply capacitor, such that during normal operation the supply capacitor is charged to a second prescribed voltage level, which is less than the first prescribed voltage level;
enabling means, responsive to the trip voltage capacitor charging to the first prescribed voltage level, for enabling the supply current to flow from the current transformer to the second load via the second current path; and
isolation means, coupled between the trip voltage capacitor and the supply capacitor and also responsive to the capacitor charging to the first prescribed voltage level, for isolating the energy on the capacitor from the current transformer.

9. A circuit arrangement, according to claim 8, further including a solenoid coupled to the trip voltage capacitor and solenoid control means for coupling the energy stored by the trip voltage capacitor to the solenoid.

10. A circuit arrangement, according to claim 9, wherein said solenoid control means further includes means, responsive to the current transformer, for determining that the supply current has exceeded a predetermined trip characteristic.

11. A circuit arrangement, according to claim 9, wherein said current shunting means further includes a first shunting circuit, responsive to the supply current, which detects a level in the supply current that exceeds a first threshold, and including means, responsive to the level exceeding the first threshold, for shunting low levels of current from the current path.

12. A circuit arrangement, according to claim 11, further including a second shunting circuit which shunts high levels of current from the supply current, and a switching circuit, responsive to the first shunting circuit, for enabling the second shunting circuit for brief intervals when the level in the supply current which exceeds the first threshold also exceeds a predetermined reference voltage.

13. A circuit arrangement, according to claim 8, further including an external power supply arranged for providing energy to the supply capacitor.

14. A circuit arrangement, according to claim 13, wherein the external power supply is arranged so that it does not supply power to the trip voltage capacitor.

15. A circuit arrangement, according to claim 13, further including a voltage limiter circuit, coupled between the external power supply and the supply capacitor, for preventing the voltage of the supply capacitor from charging to a voltage level that is greater than the second prescribed voltage level.

16. A trip unit, comprising:
current means for deriving current from a power line and providing a supply current;
a trip voltage capacitor;
a first current path coupling the current means to the trip voltage capacitor, wherein the current means charges the trip voltage capacitor to a first prescribed voltage level;
a voltage regulation circuit;
a second current path coupling the current means to the voltage regulation circuit;
a supply capacitor coupled to the second current path and an input of the voltage regulation circuit;
current shunting means, coupled to the second current path, for shunting current passing from the current means to the supply capacitor, such that during normal operation the supply capacitor is charged to a second prescribed voltage level, which is less than the first prescribed voltage level;
enabling means, responsive to the trip voltage capacitor charging to the first prescribed voltage level, for enabling the supply current to flow from the current means to the second load via the second current path; and
isolation means, coupled between the trip voltage capacitor and the supply capacitor and also responsive to the capacitor charging to the first prescribed voltage level, for isolating the energy on the trip voltage capacitor from the current means;
an external power supply arranged for providing energy to the supply capacitor; and
a voltage limiter circuit, coupled between the external power supply and the supply capacitor, for preventing the voltage of the supply capacitor from charging to a voltage level that is greater than the second prescribed voltage level.

17. A trip unit, according to claim 16, wherein the voltage limiter circuit includes a zener diode having a clamping voltage level below about 12 Volts, wherein the second prescribed voltage level is about 12 Volts, and wherein the first prescribed voltage level is at least 20 Volts.

18. A trip unit, according to claim 16, further including a solenoid coupled to the trip voltage capacitor, and solenoid control means for coupling the energy stored by the trip voltage capacitor to the solenoid.

19. A trip unit, according to claim 18, wherein said solenoid control means further includes means, responsive to the current transformer, for determining that the supply current has exceeded a predetermined trip characteristic.

20. A trip unit, according to claim 16, wherein said current shunting means further includes a first shunting circuit, responsive to the supply current, which detects a level in the supply current that exceeds a first threshold, and including means, responsive to the level exceeding the first threshold, for shunting low levels of current from supply current.

* * * * *